United States Patent
Ridgway et al.

(10) Patent No.: US 7,486,247 B2
(45) Date of Patent: Feb. 3, 2009

(54) MILLIMETER AND SUB-MILLIMETER WAVE DETECTION

(75) Inventors: Richard W. Ridgway, Westerville, OH (US); Steven Risser, Reynoldsburg, OH (US); David W. Nippa, Dublin, OH (US)

(73) Assignee: Optimer Photonics, Inc., Columbus, OH (US)

( * ) Notice: Subject to any disclaimer, the term of this patent is extended or adjusted under 35 U.S.C. 154(b) by 208 days.

(21) Appl. No.: 11/622,700

(22) Filed: Jan. 12, 2007

(65) Prior Publication Data
US 2008/0023632 A1    Jan. 31, 2008

Related U.S. Application Data

(60) Provisional application No. 60/772,921, filed on Feb. 13, 2006, provisional application No. 60/805,524, filed on Jun. 22, 2006.

(51) Int. Cl.
*H01Q 13/10* (2006.01)
(52) U.S. Cl. .................. 343/767; 343/770; 343/771
(58) Field of Classification Search .............. 343/767, 343/770, 771; 333/26, 246; 385/122
See application file for complete search history.

(56) References Cited

U.S. PATENT DOCUMENTS

| | | | |
|---|---|---|---|
| 5,015,052 A | 5/1991 | Ridgway et al. |
| 5,047,783 A | 9/1991 | Hugenin |
| 5,076,655 A | 12/1991 | Bridges |

(Continued)

FOREIGN PATENT DOCUMENTS

EP     0 668 508 A1    8/1995

(Continued)

OTHER PUBLICATIONS

Teng, C. C., "Traveling-wave polymeric optical intensity modulator with more than 40 GHz of 3-dB electrical bandwidth" Appl. Phys. Lett. 60 (13), Mar. 30, 1992, pp. 1538-1540.

(Continued)

*Primary Examiner*—Tan Ho
(74) *Attorney, Agent, or Firm*—Dinsmore & Shohl LLP (57) ABSTRACT

In accordance with one embodiment of the present invention, an antenna assembly comprising an antenna portion and an electrooptic waveguide portion is provided. The antenna portion comprises at least one tapered slot antenna. The waveguide portion comprises at least one electrooptic waveguide. The electrooptic waveguide comprises a waveguide core extending substantially parallel to a slotline of the tapered slot antenna in an active region of the antenna assembly. The electrooptic waveguide at least partially comprises a velocity matching electrooptic polymer in the active region of the antenna assembly. The velocity $v_e$ of a millimeter or sub-millimeter wave signal traveling along the tapered slot antenna in the active region is at least partially a function of the dielectric constant of the velocity matching electrooptic polymer. In addition, the velocity $v_O$ of an optical signal propagating along the waveguide in the active region is at least partially a function of the index of refraction of the velocity matching electrooptic polymer. Accordingly, the active region and the velocity matching electrooptic polymer can be configured such that $v_e$ and $v_O$ are substantially the same, or at least within a predetermined range of each other, in the active region. Additional embodiments are disclosed and claimed.

24 Claims, 5 Drawing Sheets

U.S. PATENT DOCUMENTS

| | | | |
|---|---|---|---|
| 5,309,531 A | | 5/1994 | Sheehy |
| 5,663,693 A | * | 9/1997 | Doughty et al. ............. 333/125 |
| 5,892,414 A | | 4/1999 | Doughty et al. |
| 6,020,858 A | * | 2/2000 | Sagisaka .................... 343/771 |
| 6,043,785 A | * | 3/2000 | Marino ....................... 343/767 |
| 6,075,493 A | | 6/2000 | Sugawara et al. |
| 6,317,094 B1 | | 11/2001 | Wu et al. |
| 6,703,596 B1 | | 3/2004 | Moran |
| 6,975,780 B2 | | 12/2005 | Stegmuller |
| 7,276,987 B2 | * | 10/2007 | Koriyama .................... 333/26 |
| 7,403,169 B2 | * | 7/2008 | Svensson et al. ............ 343/767 |
| 7,424,192 B2 | * | 9/2008 | Hochberg et al. ........... 385/122 |
| 2007/0097009 A1 | * | 5/2007 | Torres ........................ 343/795 |

FOREIGN PATENT DOCUMENTS

| | | |
|---|---|---|
| EP | 1 335 239 A1 | 8/2003 |
| WO | 02/18988 A2 | 3/2002 |

OTHER PUBLICATIONS

Alferness, R. C., "Velocity-Matching Techniques for Integrated Optic Traveling Wave Switch/Modulators" IEEE Journal of Quantum Electronics, vol. QE-20, No. 3, Mar. 1984, pp. 301-309.

* cited by examiner

MILLIMETER AND SUB-MILLIMETER WAVE DETECTION

CROSS-REFERENCE TO RELATED APPLICATIONS

This application claims the benefit of U.S. Provisional Application Ser. Nos. 60/772,921, filed Feb. 13, 2006, and 60/805,524, filed Jun. 22, 2006.

BRIEF SUMMARY OF THE INVENTION

The present invention relates to the detection of millimeter and sub-millimeter waves. More specifically, the present invention relates to the design and fabrication of an antenna assembly including an electrooptic waveguide configured to detect 30 GHz or greater electromagnetic signals. For the purposes of describing and defining the present invention, it is noted that reference herein to millimeter and sub-millimeter wave signals denote frequencies that are $\geq 30$ GHz.

In accordance with one embodiment of the present invention, an antenna assembly comprising an antenna portion and an electrooptic waveguide portion is provided. The antenna portion comprises at least one tapered slot antenna. The waveguide portion comprises at least one electrooptic waveguide. The electrooptic waveguide comprises a waveguide core extending substantially parallel to a slotline of the tapered slot antenna in an active region of the antenna assembly. The electrooptic waveguide at least partially comprises a velocity matching electrooptic polymer in the active region of the antenna assembly. The velocity $v_e$ of a millimeter or sub-millimeter wave signal traveling along the tapered slot antenna in the active region is at least partially a function of the dielectric constant of the velocity matching electrooptic polymer. In addition, the velocity $v_O$ of an optical signal propagating along the waveguide in the active region is at least partially a function of the index of refraction of the velocity matching electrooptic polymer. Accordingly, the active region and the velocity matching electrooptic polymer can be configured such that $v_e$ and $v_O$ are substantially the same, or at least within a predetermined range of each other, in the active region.

In accordance with another embodiment of the present invention, the tapered slot antenna comprises first and second electrically conductive elements arranged to define a radiating slot of the antenna. The first electrically conductive element is arranged in a plane above the electrooptic waveguide and the second electrically conductive element is arranged in a plane below the electrooptic waveguide.

In accordance with yet another embodiment of the present invention, the tapered slot antenna and the electrooptic waveguide are configured such that the millimeter or sub-millimeter wave signal traveling along the tapered slot antenna is imparted on the optical signal as frequency sidebands of an optical carrier frequency. In addition, a frequency-dependent filter is positioned to discriminate the frequency sidebands from the carrier frequency band in an optical signal propagating along the electrooptic waveguide portion, downstream of the active region.

In accordance with yet another embodiment of the present invention, a method of fabricating an antenna assembly is provided. According to the method, the electrooptic waveguide at least partially comprises a velocity matching electrooptic polymer in the active region of the antenna assembly such that a velocity $v_e$ of a millimeter or sub-millimeter wave signal traveling along the tapered slot antenna in the active region is at least partially a function of the dielectric constant of the velocity matching electrooptic polymer and a velocity $v_O$ of an optical signal propagating along the waveguide in the active region is at least partially a function of the index of refraction of the velocity matching electrooptic polymer. In addition, the effective permittivity $\in_{eff}$ of the active region and the effective index of refraction $\eta_{eff}$ of the active region are established such that $v_e$ and $v_O$ are substantially the same or satisfy a predetermined relation.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figures 1A, 1B:
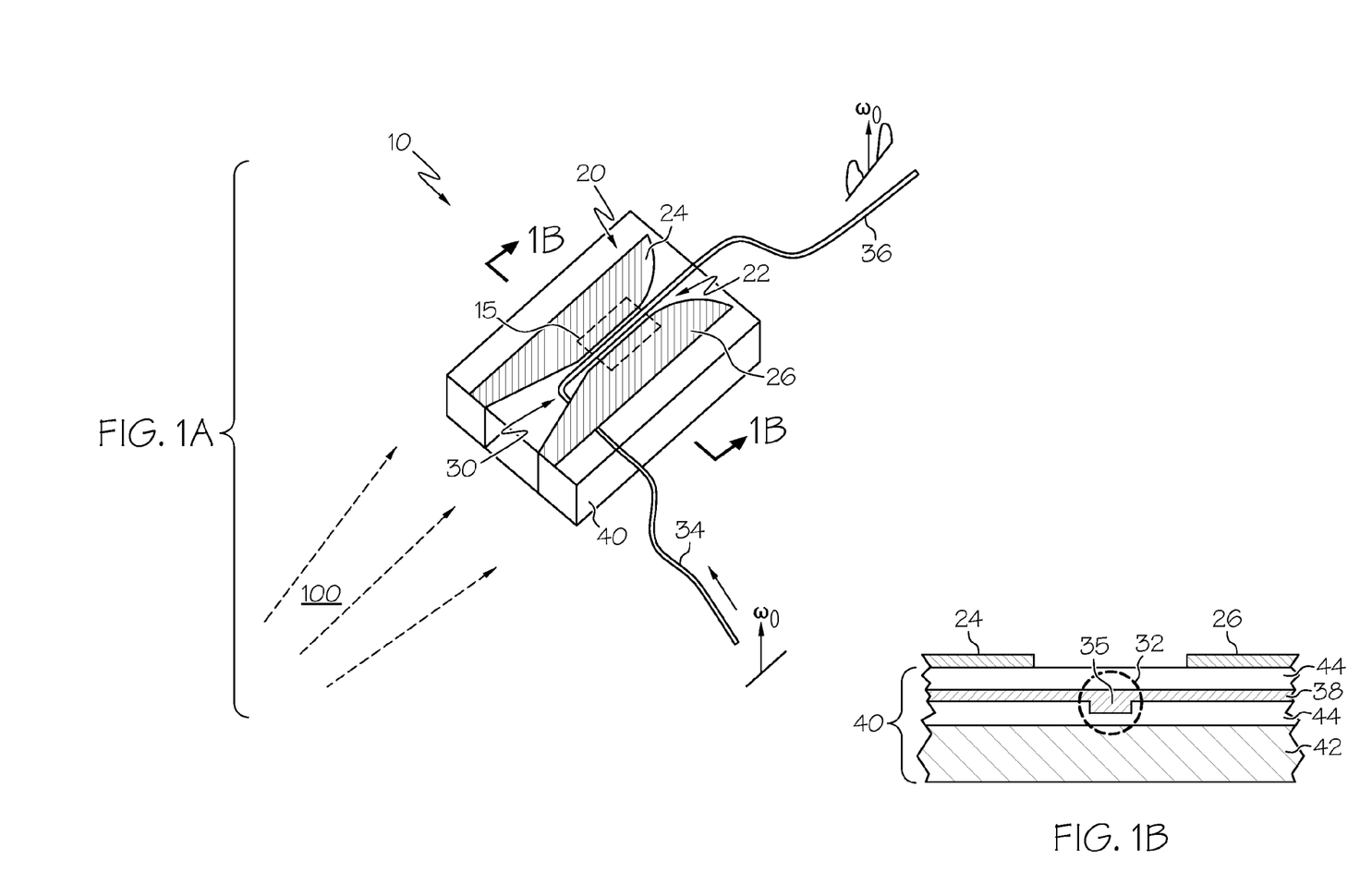
FIG. 1A is a schematic illustration of an antenna assembly according to one embodiment of the present invention.
FIG. 1B is a schematic cross sectional illustration of the active region of the antenna assembly illustrated in FIG. 1A.

An antenna assembly 10 according to one embodiment of the present invention is illustrated in FIGS. 1A and 1B. Generally, the antenna assembly 10 comprises an antenna portion 20 and an electrooptic waveguide portion 30. The antenna portion 20 is configured as a tapered slot antenna, the design of which will be described in further detail below with reference to FIGS. 2 and 3. The waveguide portion 30 comprises at least one electrooptic waveguide 32 that extends along at least a portion of an optical path between an optical input 34 and an optical output 36 of the antenna assembly 10. For the purposes of describing and defining the present invention, it is noted that reference herein to an "optical" signal denotes electromagnetic radiation in the ultraviolet, visible, infrared, or near-infrared portions of the electromagnetic spectrum.

The electrooptic waveguide 32 comprises a waveguide core 35 that extends substantially parallel to a slotline 22 of the tapered slot antenna 20 in an active region 15 of the antenna assembly 10 and at least partially comprises a velocity matching electrooptic polymer 38 in the active region 15 of the antenna assembly 10. It is contemplated that the velocity matching electrooptic polymer 38 may form the waveguide core 35, all or part of the cladding surrounding a non-polymeric waveguide core, or both the core 35 and the cladding of the waveguide 32.

The tapered slot antenna 20 and the electrooptic waveguide 32 are positioned relative to each other such that: (i) the velocity $v_e$ of a millimeter or sub-millimeter wave signal 100 traveling along the tapered slot antenna 20 in the active region 15 is at least partially a function of the dielectric constant of the velocity matching electrooptic polymer 38 and (ii) the velocity $v_O$ of an optical signal propagating along the waveguide core 35 in the active region 15 is at least partially a function of the index of refraction of the velocity matching electrooptic polymer 38. For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

Given this common dependency on the properties of the velocity matching electrooptic polymer 38, the active region 15 and the velocity matching electrooptic polymer 38 of the antenna assembly 10 can be configured to enhance the velocity matching of the millimeter wave and the optical signal in the active region 15. For example, it is contemplated that the active region 15 and the velocity matching electrooptic polymer 38 can be configured such that $v_e$ and $v_O$ are substantially the same in the active region or such that they at least satisfy the following relation:

$$\frac{|v_e - v_O|}{v_O} \leq 20\%.$$

Although the antenna assembly described above is not limited to specific antenna applications, the significance of the velocity matching characteristics of the assembly can be described with reference to applications where a millimeter-wave signal traveling along the tapered slot antenna 20 creates sidebands on an optical carrier signal propagating in the waveguide core 35. Specifically, as is illustrated in U.S. Patent Application Pub. No. 2008/0199124 (Ser. No. 11/381, 618, filed May 9, 2006), the relevant portions of which are incorporated herein by reference, a millimeter-wave signal is used to create sidebands on an optical carrier by directing a coherent optical signal of frequency $\omega_0$ along the electrooptic waveguide portion of an electrooptic modulator while a millimeter-wave voltage of frequency $\omega_m$ is input to the traveling wave electrodes of the modulator. In the embodiment of the present invention illustrated in FIGS. 1A and 1B, the first and second electrically conductive elements 24, 26 of the tapered slot antenna 20 and the electrooptic waveguide 32 form the electrooptic modulator and a coherent optical carrier signal is directed along the electrooptic waveguide 32. The first and second electrically conductive elements 24, 26 function in a manner that is analogous to the respective traveling wave electrodes described in the aforementioned publication and, as such, cooperate with the electrooptic waveguide 32 to create sidebands on the optical carrier propagating along electrooptic waveguide 32.

More specifically, as the optical carrier $\omega_0$ and millimeter-wave signal 100 co-propagate along the length of the electrooptic modulator formed by the tapered slot antenna 20 and the electrooptic waveguide 32, the interaction of the electric field of the millimeter-wave 100 with the electrooptic material of the polymer in the active region 15 creates a refractive index change in the electrooptic waveguide 32 which oscillates with the time-varying electric field of the millimeter-wave 100. This time variation of the refractive index results in a time-dependent phase shift of the optical carrier, which is equivalent to imparting sidebands to the optical carrier $\omega_0$. The modulation of the optical carrier by the millimeter-wave voltage results in an optical output from the modulator which has a component at the carrier frequency $\omega_0$ and at sideband frequencies $\omega_0 \pm \omega_m$. The present inventors have recognized that magnitude of the response at the sidebands is determined by the ratio of the millimeter-wave voltage to $V_\pi$, the voltage required to completely change the modulator from the on to the off state, and by the degree of velocity matching between the optical carrier and the millimeter-wave that co-propagate along the modulator.

Although the millimeter-wave voltage is an external variable, the degree of velocity matching between the optical carrier and the millimeter-wave is primarily a function of the design parameters of the antenna assembly 10 and, as such, can be optimized through careful control of the design of the parameters of the antenna assembly 10. For example, as the millimeter-wave propagates through the active region 15, which comprises the electrically conductive elements 24, 26 of the tapered slot antenna 20 and a dielectric substrate 40, the velocity $v_e$ of the millimeter or sub-millimeter wave signal in the active region 15 is a function of effective permittivity $\in_{eff}$ of the active region 15:

$$v_e = c/\sqrt{\in_{eff}}$$

In the active region 15, the dielectric substrate 40 defines a thickness t and comprises a base layer 42, the waveguide core 35, the velocity matching electrooptic polymer 38, at least one additional optical cladding layer 44, each of which contribute to the thickness t in the active region 15. Thus, the effective permittivity $\in_{eff}$ of the active region 15 is a function of the substrate thickness t and the respective dielectric constants of the base layer 42, the waveguide core 35, the velocity matching electrooptic polymer 38, and the additional optical cladding layers 44.

The velocity $v_O$ of the optical signal propagating along the waveguide 32 in the active region 15 is a function of the effective index of refraction $\eta_{eff}$ of the active region 15:

$$v_O = c/\eta_{eff}$$

The effective index of refraction $\eta_{eff}$ of the active region 15 is a function of the respective indices of refraction of the waveguide core 35, the velocity matching electrooptic polymer 38, and the additional optical cladding layers 44. Accordingly, the degree of velocity matching between the optical carrier and the millimeter-wave can be optimized by controlling the effective permittivity $\in_{eff}$ and the effective index of refraction $\eta_{eff}$ of the active region 15.

Where a velocity matching electrooptic polymer is selected as a component of the waveguide 32, it is possible to configure the electrooptic modulator such that the effective index of refraction $\eta_{eff}$ of the active region 15 is 1.5 and the velocity $v_O$ of the optical signal is:

$$v_O = c/1.5$$

In the same context, if we select a silica-based dielectric substrate 40 and use the velocity matching electrooptic polymer in the waveguide 32, it is possible to configure the active region such that the effective permittivity $\in_{eff}$ of the active region is 2.25 and the velocity $v_e$ of the millimeter or sub-millimeter wave signal matches the velocity $v_O$ of the optical signal:

$$v_e = c/\sqrt{2.25} = c/1.5$$

In contrast, the velocity $v_e$ of the millimeter or sub-millimeter wave signal in a conventional silica-based tapered slot antenna having an effective permittivity $\in_{\mathit{eff}}$ of about 3.76 would be significantly different than the velocity $v_O$ of the optical signal:

$$v_e = c/\sqrt{3.76} = c/1.94$$

To maintain total phase shift in the electrooptic modulator structure of the active region 15 within 50% of the maximum possible phase shift, the active region 15 and the velocity matching electrooptic polymer 38 should be configured such that the velocity $v_e$ and the velocity $v_O$ satisfy the following relation:

$$\left|1 - \frac{v_e}{v_O}\right| \le \frac{2.8}{L\beta}$$

where L is the length of the active region and $\beta$ is the propagation constant of the waveguide.

One method to achieve velocity matching is to use materials where the respective velocities of the optical signal and the millimeter-wave is effectively equal. Velocity matching can also be achieved through specialized device design. For example, the thickness of the dielectric substrate or any of its component layers can be tailored through silicon micromachining, reactive ion etching, or otherwise to achieve velocity matching. Alternatively, one can construct an effective dielectric constant by altering the geometry of the dielectric substrate 40, e.g., by forming holes in the dielectric, or changing the shape or dimensions of the dielectric. Referring to the antennae 20 illustrated in FIGS. 2 and 3, in the context of a 94 GHz wave traveling along the antennae 20, assuming the slotline 22 is characterized by an electrode gap of 20 microns in the active region 15 and the electrodes 24, 26 are fabricated on silica, a dielectric substrate thickness t of approximately 170 microns can form the basis of a device design with suitable velocity matching between the millimeter wave and an optical signal wave.

The antenna assembly 10 illustrated in FIGS. 1A and 1B is configured such that an optical signal propagating from the optical input 34 to the optical output 36 merely passes through a single active region 15 comprising a single tapered slot antenna 20. Turning more specifically to the design of the tapered slot antenna 20, it is noted that tapered slot antennae (TSA) are end-fire traveling wave antennae and typically consist of a tapered slot etched onto a thin film of metal. This can be done either with or without a dielectric substrate on one side of the film. Planar tapered slot antennae have two common features: the radiating slot and a feed line. The radiating slot acts as the ground plane for the antenna and the antenna is fed by the feed line, which may, for example, be a balanced slotline or any suitable feed structure. The nature of the specific feed structure to be used is beyond the scope of the present invention and may be gleaned from any conventional or yet to be developed teachings on the subject, including those teachings set forth in U.S. Pat. No. 6,317,094, the germane portions of which are incorporated herein by reference. Generally, the feed structure should be relatively compact and have low loss. Suitable feed structures include, but are not limited to, coaxial line feeds and the microstrip line feeds. For the purposes of defining and describing the present invention, it is noted that reference herein to an antenna "assembly" is not intended to imply that the assembly is a one-piece, integral assembly or even an assembly where all of the recited components are physical connected to each other. Rather, antenna assemblies according to the present invention may merely be a collection of components that are functionally linked to each other in a particular manner.

Figure 2:
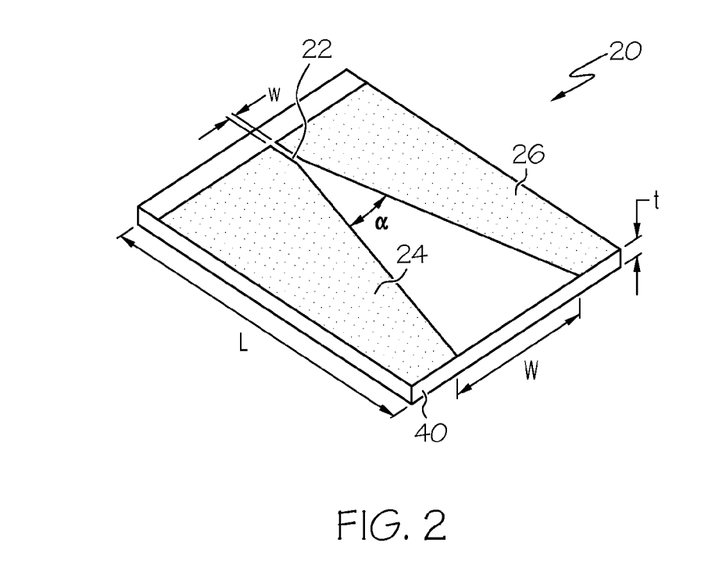
FIGS. 2 and 3 are schematic illustrations of two of the many alternative tapered slot antenna configurations for use in the present invention.
Figure 3:
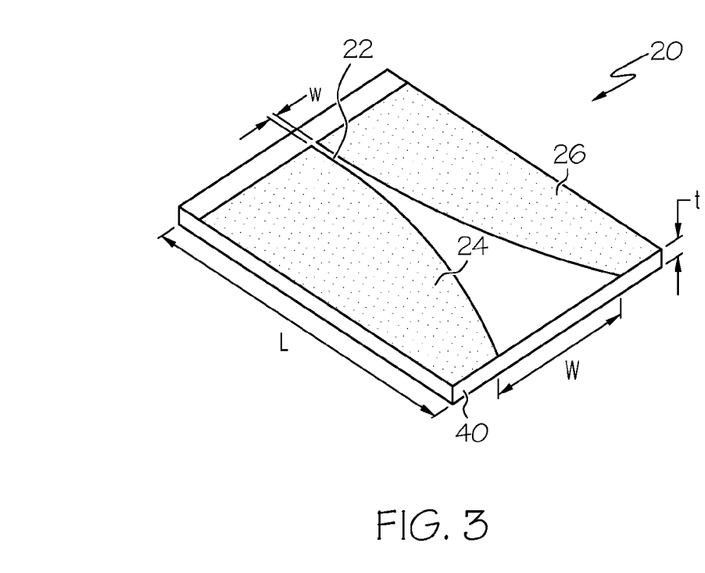

Many taper profiles exist for TSA including, but not limited to, exponential, tangential, parabolic, linear, linear-constant, exponential-constant, step-constant, broken linear, etc. FIG. 2 shows a linearly tapered profile. FIG. 3 shows a Vivaldi profile. In FIGS. 2 and 3, the gap between the first and second electrically conductive elements 24, 26 of the tapered slot antenna 20 is much smaller in the active region 15, e.g., on the order of 20 microns, and behaves much more like a waveguide for the millimeter-wave signal. The reduction in the gap between the two electrically conductive elements 24, 26 of the antenna 20 increases the magnitude of the electric field of the millimeter-wave signal, which is important for electrooptic materials where the response is proportional to the electric field, as opposed to the voltage across the gap. In operation, incident millimeter-wave radiation enters the antenna opening and propagates along the antenna elements 24, 26 toward the active region 15. The millimeter-wave signal exits the active region 15 and can be re-radiated or terminated into a fixed impedance.

The antenna assemblies illustrated in FIGS. 1-3 may, for example, be fabricated by first providing the base layer 42 with a degree of surface roughness that is sufficiently low for optical applications. The lower cladding 44 is coated onto this substrate and a waveguide pattern is etched therein. The waveguide core and the velocity matching electrooptic polymer 38, which may be formed of the same or different materials, are then coated onto the etched cladding and an upper cladding 44 is formed over the electrooptic layer 38. Finally, the electrically conductive elements 24, 26 of the tapered slot antenna 20 is fabricated on the top cladding.

The electrooptic material 38 can be poled, if required for the response. The refractive indices of the lower and upper claddings 44 are lower than that of the electrooptic layer 38, and the thickness of the claddings 44 are sufficient to optically isolate the optical carrier from the substrate 42 and the antenna 20. The thickness of the electrooptic layer 38 is such that guided modes of the optical carrier are confined to the defined electrooptic waveguide. Although waveguide fabrication has been described herein in the context of etching the lower cladding, any other method for forming an electrooptic waveguide in an electrooptic material, such as etching the electrooptic material, photobleaching, or diffusion, can be used to define the electrooptic waveguide.

As is noted above, the tapered slot antenna 20 comprises first and second electrically conductive elements 24, 26 arranged to define the radiating slot of the antenna 20. Although the embodiments of FIGS. 1-3 include first and second electrically conductive elements 24, 26 arranged in a common plane, above the electrooptic waveguide 32, alternative configurations are contemplated. For example, referring to FIGS. 4 and 5, the first and second electrically conductive elements 24, 26 can be arranged in different planes, one above the electrooptic waveguide 32 and the other below the electrooptic waveguide 32. In addition, as is illustrated in FIGS. 4 and 5, the first and second electrically conductive elements 24, 26 can be are arranged to overlap in the active region 15 of the antenna assembly.

Figure 4:
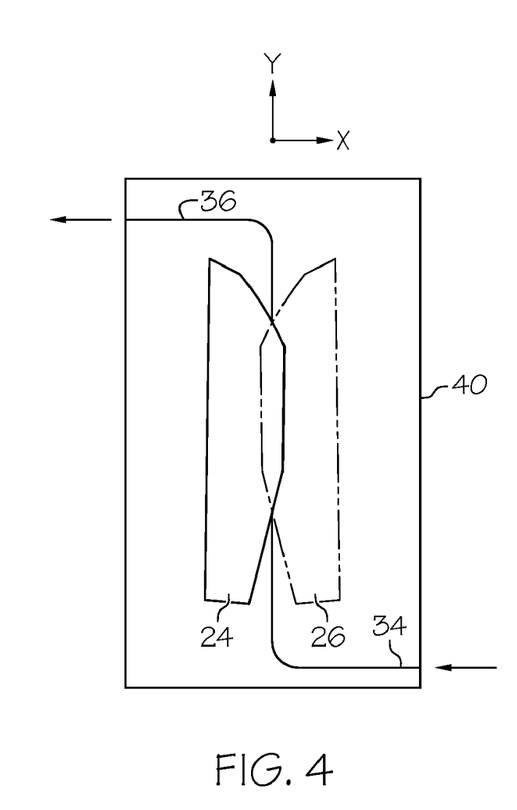
FIG. 4 is a schematic plan view of an antenna assembly according to another embodiment of the present invention.
Figure 5:
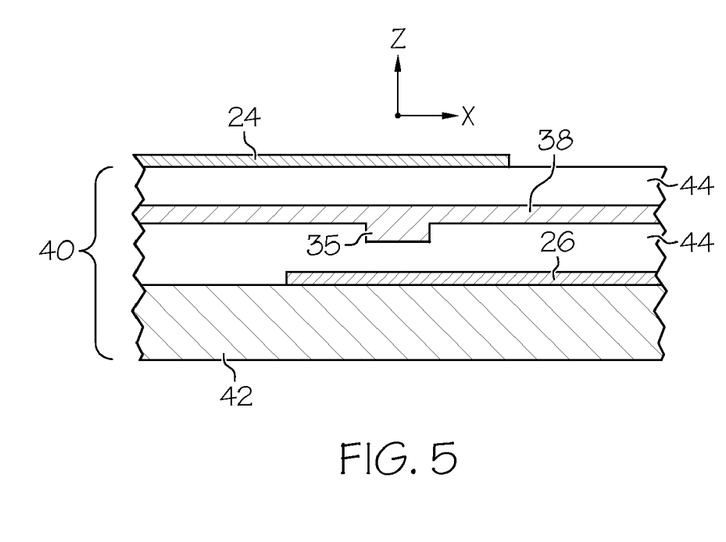
FIG. 5 is a schematic cross sectional illustration of the active region of the antenna assembly illustrated in FIG. 4.

It is contemplated that the fabrication approach illustrated in FIGS. 4 and 5 can lead to an enhanced response of the EO polymer modulator to the millimeter wave, improving the responsiveness of the antenna. This enhanced response can result from both improved poling of the electrooptic material and stronger interaction between the millimeter-wave electric field and the electrooptic material. The assembly of FIGS. 4 and 5 can be fabricated by forming the lower electrode 26 on the substrate 42, applying the lower cladding 44, forming the waveguide core 35, applying the electrooptic layer 38 and the upper cladding 44, and finally forming the upper electrode 24 of the tapered slot antenna 20. The present inventors have recognized that many current electrooptic polymers have better electrooptic response when poled by parallel plate electrodes, as compared to coplanar electrodes. Accordingly, at this point, the electrooptic material can be poled, if required for the EO response, using conventional or other suitable, yet to be developed poling conditions for the EO material.

The total thickness of the claddings and electrooptic layer is typically in the range of 5 to 25 microns, although other thicknesses are within the scope of the present invention. When the millimeter-wave radiation is first incident on the antenna, the electric field is polarized along the X-axis in FIGS. 4 and 5. However, as the millimeter-wave propagates along the antenna 20, the polarization of the electric field is rotated until the field is polarized in the Z-direction in the active region 15. In the active region, because the millimeter-wave is more tightly confined to the cladding and electrooptic material, the velocity of the millimeter-wave signal is determined by the effective dielectric constant of these combined layers.

In applications of the present invention where TM light does not guide in the waveguide 32 until after the device has been poled, additional metal can be added on the substrate surface to allow for poling of the complete length of the waveguide 32. For simplicity, the waveguide can be routed to exit the device on the same side as which it entered, although this is not a requirement. The device is fabricated by first forming the lower electrode 26 on the base layer 42, applying the lower cladding 44, forming the waveguide core 35 and the electrooptic layer 38, then the upper cladding 44. After the upper cladding 44 is placed on the device, a set of poling electrodes is formed over the waveguide 32 and the electrooptic material 38 is poled. These poling electrodes can be removed for convenient fabrication of the upper electrode 24, which is subsequently formed on the upper cladding 44.

In the configuration of FIGS. 4 and 5, where the vertical separation between the first and second electrically conductive elements 24, 26 is on the order of about 5 to 25 microns, the electric field in the active region 15 will alter the refractive index seen by the TM polarized light propagating in the electrooptic waveguide 32. The electrodes provide a parallel plate field, which can be more efficient interacting with the electrooptic material than the field generated with the coplanar electrodes illustrated in FIGS. 1-3. This enhanced electric field and the potentially smaller electrode gap can dramatically enhance the response of the antenna assembly 10 to millimeter-wave radiation.

In each of the embodiments described herein with reference to FIGS. 1-5, an optical carrier signal at the optical input 34 of the waveguide 32 enters the antenna slot 22 and continues through to the active region 15. In the active region 15, the electric field of the incident millimeter-wave (MMW) 100 interacts with the electrooptic material 38 of the active region 15 to alter the phase of the optical signal. The optical signal accumulates phase shift over the entire length of the active region 15 and propagates to the optical output 36 of the waveguide 32, where the optical carrier is transitioned to an optical fiber, waveguide, or other optical medium.

FIGS. 1-5 depict the active region 15 as a phase modulating electrooptic modulator, where the optical signal remains in a single waveguide. Alternatively, it is possible to configure the active region as a Mach-Zehnder interferometer (MZI). In this case, the optical signal would be evenly divided between two electrooptic waveguides before one of the arms enters the active region 15 between the two electrodes 24, 26 of the tapered slot antenna 20. The second arm would remain outside the active region of the antenna 20. Downstream of the active region, the two optical signals would be recombined. It is also contemplated that one or both of the waveguide arms could have a mechanism to alter the phase of light propagating along that arm. The relative phase between the two waveguide arms could be adjusted so the MZI could be in its lowest power state. In this state, the optical carrier could be reduced by 15 or more dB, while the power contained in the sidebands would be unaltered. Because only half the original optical power traverses the active region, the power in the sideband would be approximately 3 dB lower than in the phase modulator case. However, because the carrier would be reduced by much more than 3 dB, it is contemplated that the signal to noise ratio would be greatly improved using the MZI configuration.

Figure 6:
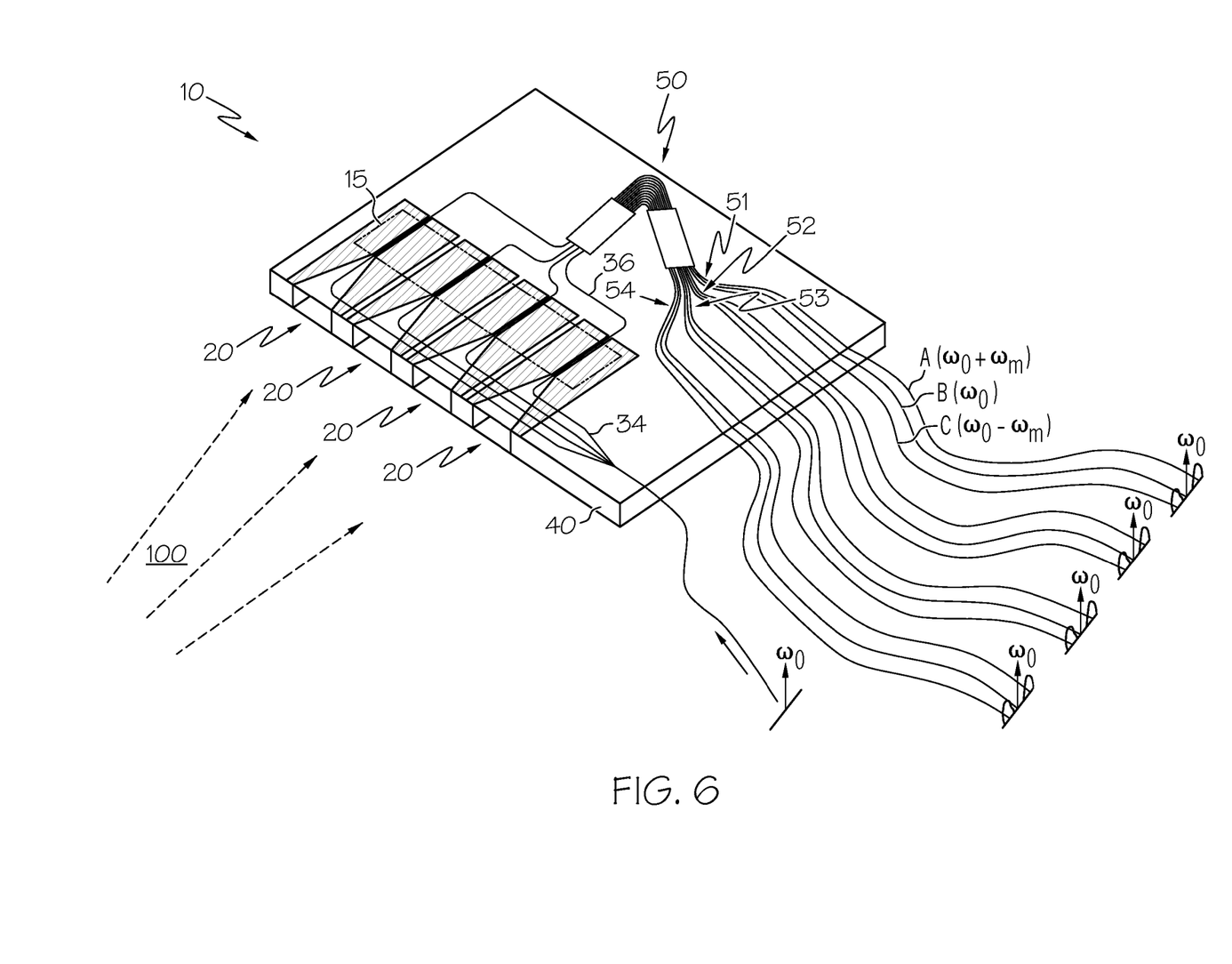
FIG. 6 is a schematic illustration of an antenna assembly according to the present invention configured as a one-dimensional focal plane array.
Figure 7:
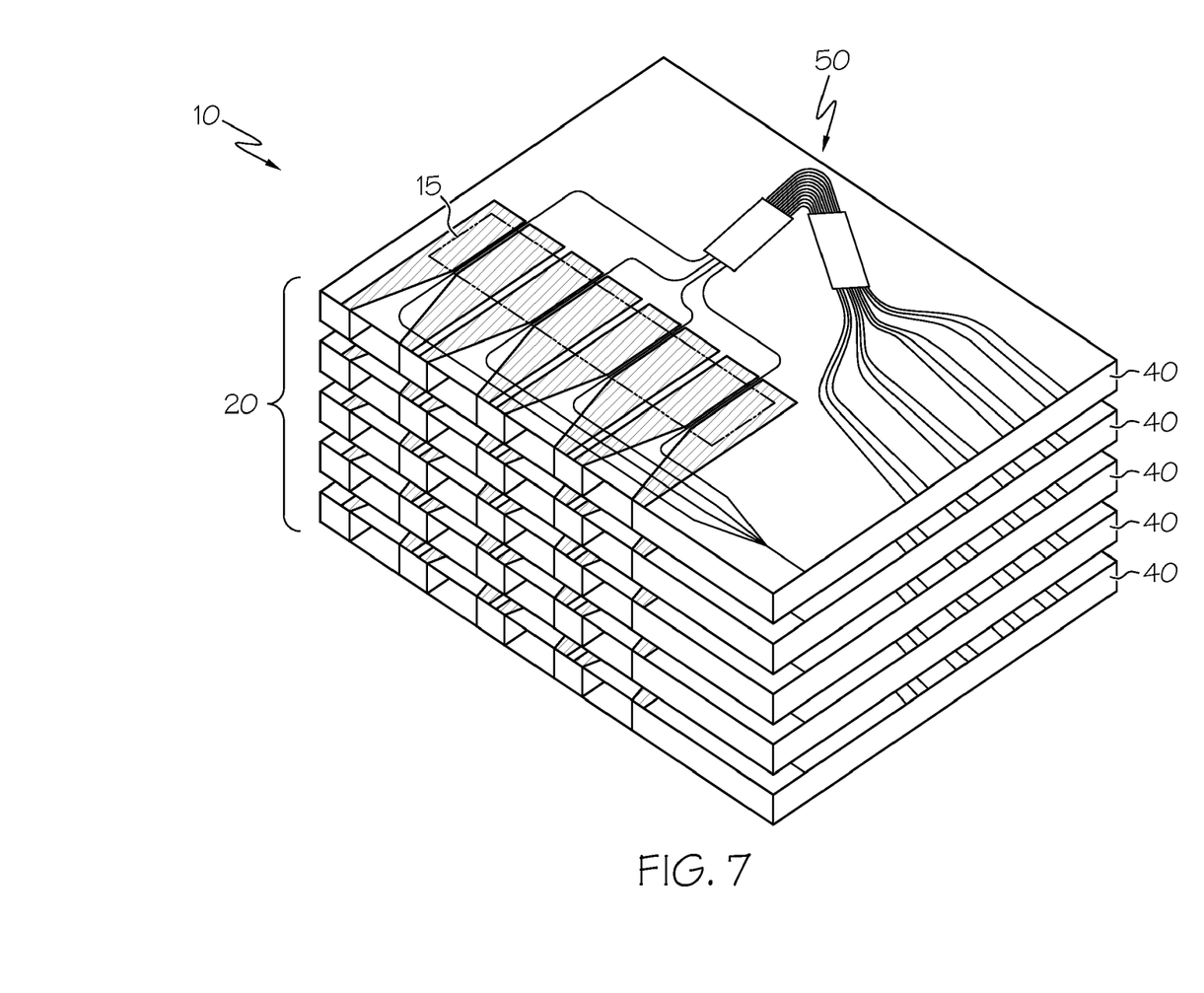
FIG. 7 is a schematic, partially exploded illustration of an antenna assembly according to the present invention configured as a two-dimensional focal plane array.

Turning now to FIGS. 6 and 7, a plurality of tapered slot antennae 20 and corresponding waveguide cores having respective input and output portions 34, 36 can be arranged on a common substrate 40. For each tapered slot antennae 20, the optical signal at the optical output 36 of the waveguide core includes the carrier frequency band $\omega_0$ and the frequency sidebands $\omega_0 \pm \omega_m$. Each of these signals can be directed through a frequency dependent optical filter 50 to discriminate the frequency sidebands $\omega_0 \pm \omega_m$ from the carrier frequency band $\omega_0$ by separating the frequency sidebands $\omega_0 \pm \omega_m$ from the optical carrier $\omega_0$ and directing the sidebands $\omega_0 \pm \omega_m$ and the optical carrier $\omega_0$ to individual component outputs A, B, C of one of the filter output ports 51, 52, 53, 54. Further waveguides, fibers, or other suitable optical propagation media are provided downstream of the filter output ports 51-54 to direct the signals to a photodetector array or some other type of optical sensor.

FIGS. 6 and 7 also illustrate an embodiment of the present invention where the tapered slot antennae 20 are arranged in a one or two-dimensional focal plane array. In addition, the waveguide cores and the tapered slot antennae 20 can be configured as a parallel electrooptical circuit. In such a configuration, the output of the photodetector array can be used to analyze the MMW signal 100 in one or two dimensions because the respective output 36 of each sensor element within the photodetector array will be a function of the magnitude of the millimeter-wave voltage input to the modulator at a position corresponding to the sensor element defined by the corresponding antenna 20. More specifically, as is illustrated in FIGS. 6 and 7, each of the tapered slot antennae 20 arranged in the array defines an antenna pixel within the focal plane array. As such, each antenna 20 receives a distinct pixel portion of a millimeter or sub-millimeter wave signal 100 incident on the focal plane array and the optical signals at the respective output portions 36 of each waveguide will provide a sensor output indicative of the one or two-dimensional distribution of the MMW signal 100.

In the case of the one-dimensional array illustrated in FIG. 6, it is noted that the one-dimensional array of tapered slot antennae 20 can be formed on a common substrate 40 and a twelve or more channel AWG 50, also formed on the common substrate 40, can be provided to filter the signals from all four antennae 20 simultaneously. FIG. 7 illustrates a similar embodiment of the present invention, with the exception that a plurality of the one-dimensional arrays illustrated in FIG. 6 are stacked to form a two-dimensional array of tapered slot antennae 20. In the embodiment of FIG. 7, it is contemplated that a single AWG can be used for each one-dimensional grouping of antennae 20 or, if desired, a single AWG can be used to perform the filtering for the stacked antenna array.

Although FIGS. 6 and 7 schematically illustrate the use of an arrayed waveguide grating (AWG) as the optical filter 50, the optical filtering function of the illustrated embodiment can be accomplished using a variety of technologies including Bragg grating reflective filters, wavelength-selective Mach-Zehnder filters, multilayer thin film optical filters, micro ring resonator filters, and directional coupler filters that are wavelength selective. It is further contemplated that the embodiment illustrated in FIGS. 6 and 7 is also a viable alternative where lithium niobate or other non-polymeric electrooptic materials are utilized in forming the waveguide 32.

An arrayed waveguide grating is particularly useful because it is an integrated optical device with multiple channels characterized by relatively narrow bandwidths. In operation, an AWG will take an input optical signal which has multiple frequencies, and will output N evenly spaced frequencies at different outputs. For example, an AWG with a channel spacing of 30 GHz or 60 GHz would be well-suited for a 120 GHz antenna system. The desired channel spacing of the AWG should be such that the frequency of the millimeter-wave is a multiple or close to a multiple of the AWG channel spacing.

Although the above discussion of the properties of AWGs focused on the use of a single input port of the AWG, an AWG with N output ports will often also have N input ports, each of which outputs light to all N output ports. For example, in the context of an 16×16 AWG (16 inputs×16 outputs), each of the 16 input ports has 16 evenly spaced wavelengths of light, with spacing of the light corresponding to the designed spacing of the AWG. If we then look at the output of a single port, we see that the optical output of the selected port also has the 16 individual wavelengths, but each wavelength from came from a different input port. Accordingly, as is illustrated in FIG. 6, if four distinct optical signals are output from four distinct optical outputs 36 corresponding to four distinct antennae 20, each of these outputs can include an optical carrier $\omega_0$ and two sidebands $\omega_0 \pm \omega_m$. If these four optical signals are then fed into four different input ports A of the AWG, the four optical carriers and their corresponding eight sidebands will exit from twelve different output ports of the AWG. Thus, a single AWG can be used to filter multiple input signals, as long as the number of input signals is less than the number of AWG ports divided by three (the number of distinct wavelength bands input at each port).

A second advantage to using an AWG as the optical filter is also described in FIG. 6. An AWG distinguishes both sidebands from its associated optical carrier. In contrast, a standard bandpass filter would remove the optical carrier and one of the sidebands. Further, if the two sidebands are coherent, which they are in this case, they can be recombined downstream of the AWG, leading to a 3 dB increase in the optical response over using just a single sideband.

It is noted that recitations herein of a component of the present invention being "configured" to embody a particular property, function in a particular manner, etc., are structural recitations, as opposed to recitations of intended use. More specifically, the references herein to the manner in which a component is "configured" denotes an existing physical condition of the component and, as such, is to be taken as a definite recitation of the structural characteristics of the component. For example, in the context of the present invention these structural characteristics may include the electrical & optical characteristics of the component or the geometry of the component.

It is noted that terms like "preferably," "commonly," and "typically," when utilized herein, should not be taken to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue. The term "substantially" is further utilized herein to represent a minimum degree to which a quantitative representation must vary from a stated reference to yield the recited functionality of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An antenna assembly comprising an antenna portion and an electrooptic waveguide portion, wherein:
   the antenna portion comprises at least one tapered slot antenna;
   an electrooptic waveguide extends along at least a portion of an optical path between an optical input and an optical output of the antenna assembly;
   the electrooptic waveguide comprises a waveguide core extending substantially parallel to a slotline of the tapered slot antenna in an active region of the antenna assembly;
   the electrooptic waveguide at least partially comprises a velocity matching electrooptic polymer in the active region of the antenna assembly;
   a velocity $v_e$ of a millimeter or sub-millimeter wave signal traveling along the tapered slot antenna in the active region is at least partially a function of the dielectric constant of the velocity matching electrooptic polymer;
   a velocity $v_O$ of an optical signal propagating along the waveguide in the active region is at least partially a function of the index of refraction of the velocity matching electrooptic polymer; and
   the active region and the velocity matching electrooptic polymer are configured such that $v_e$ and $v_O$ satisfy the following relation:

$$\frac{|v_e - v_O|}{v_O} \leq 20\%.$$

2. An antenna assembly as claimed in claim 1 wherein:
   the active region comprises electrically conductive elements of the tapered slot antenna and a dielectric substrate;
   the dielectric substrate defines a thickness t in the active region and comprises a base layer, the waveguide core, the velocity matching electrooptic polymer, at least one additional optical cladding layer, each of which contribute to the thickness t in the active region;

the velocity $v_e$ of the millimeter or sub-millimeter wave signal in the active region is a function of effective permittivity $\epsilon_{eff}$ the active region;

the effective permittivity $\epsilon_{eff}$ is a function of the substrate thickness t and the respective dielectric constants of the base layer, the waveguide core, the velocity matching electrooptic polymer, and the additional optical cladding layer;

the velocity $v_O$ of the optical signal propagating along the waveguide in the active region is a function of the effective index of refraction $\eta_{eff}$ of the active region; and the effective index of refraction $\eta_{eff}$ is a function of the respective indices of refraction of the waveguide core, the velocity matching electrooptic polymer, and the additional optical cladding layer.

3. An antenna assembly as claimed in claim 1 wherein the active region and the velocity matching electrooptic polymer are configured such that the velocity $v_e$ and the velocity $v_O$ satisfy the following relation:

$$\left|1 - \frac{v_e}{v_O}\right| \leq \frac{2.8}{L\beta}$$

where L is the length of the active region and $\beta$ is the propagation constant of the waveguide.

4. An antenna assembly as claimed in claim 1 wherein the antenna portion and the electrooptic waveguide portion are configured such that an optical signal propagating from the optical input to the optical output of the antenna assembly passes through a single one of the active regions of the antenna assembly, the single active region comprising a single tapered slot antenna.

5. An antenna assembly as claimed in claim 1 wherein:
the tapered slot antenna comprises first and second electrically conductive elements arranged to define a radiating slot of the antenna; and
the first and second electrically conductive elements are arranged in a common plane, above the electrooptic waveguide.

6. An antenna assembly as claimed in claim 1 wherein:
the tapered slot antenna comprises first and second electrically conductive elements arranged to define a radiating slot of the antenna;
the first electrically conductive element is arranged in a plane above the electrooptic waveguide; and
the second electrically conductive element is arranged in a plane below the electrooptic waveguide.

7. An antenna assembly as claimed in claim 6 wherein the first and second electrically conductive element are arranged to overlap in the active region of the antenna assembly.

8. An antenna assembly as claimed in claim 1 wherein the antenna portion comprises a plurality of the tapered slot antennae arranged in a one-dimensional, focal plane array.

9. An antenna assembly as claimed in claim 1 wherein the antenna portion comprises a plurality of the tapered slot antennae arranged in a two-dimensional, focal plane array.

10. An antenna assembly as claimed in claim 1 wherein the antenna assembly further comprises a frequency-dependent filter positioned to discriminate frequency sidebands from a carrier frequency band in an optical signal propagating along the electrooptic waveguide portion, downstream of the active region.

11. An antenna assembly as claimed in claim 10 wherein the frequency-dependent filter comprises a plurality of filter output ports and discriminates the frequency sidebands from the carrier frequency band by separating the frequency sidebands from the optical carrier and directing the sidebands and the optical carrier to individual ones of the filter output ports.

12. An antenna assembly as claimed in claim 11 wherein the frequency-dependent filter is configured to discriminate the sidebands and the carrier band coherently such that the frequency sidebands can be recombined at the optical output of the antenna assembly.

13. An antenna assembly as claimed in claim 10 wherein:
the antenna assembly comprises a plurality of the optical outputs;
the antenna portion comprises a plurality of the tapered slot antennae and electrooptic waveguides arranged in a focal plane array; and
the frequency-dependent filter comprises a plurality of input ports optically coupled to corresponding ones of the electrooptic waveguides and a plurality of filter output ports configured to direct optical signals to corresponding ones of the optical outputs of the antenna assembly.

14. An antenna assembly comprising an antenna portion and an electrooptic waveguide portion, wherein:
the antenna portion comprises at least one tapered slot antenna;
the waveguide portion comprises at least one electrooptic waveguide;
the electrooptic waveguide extends along at least a portion of an optical path between an optical input and an optical output of the antenna assembly;
the electrooptic waveguide comprises a waveguide core in an active region of the antenna assembly;
the electrooptic waveguide at least partially comprises a velocity matching electrooptic polymer in the active region of the antenna assembly;
a velocity $v_e$ of a millimeter or sub-millimeter wave signal traveling along the tapered slot antenna in the active region is at least partially a function of the dielectric constant of the electrooptic polymer;
a velocity $v_O$ of an optical signal propagating along the waveguide in the active region is at least partially a function of the index of refraction of the electrooptic polymer;
the tapered slot antenna comprises first and second electrically conductive elements arranged to define a radiating slot of the antenna;
the first electrically conductive element is arranged in a plane above the electrooptic waveguide; and
the second electrically conductive element is arranged in a plane below the electrooptic waveguide.

15. An antenna assembly as claimed in claim 14 wherein the first and second electrically conductive elements are arranged to overlap in the active region of the antenna assembly.

16. An antenna assembly comprising an antenna portion, a waveguide portion, and a frequency dependent filter, wherein:
the antenna portion comprises at least one tapered slot antenna;
the waveguide portion extends along at least a portion of an optical path between an optical input and an optical output of the antenna assembly;
the waveguide portion comprises a waveguide core in an active region of the antenna assembly;

the tapered slot antenna and the electrooptic waveguide are configured such that the millimeter or sub-millimeter wave signal traveling along the tapered slot antenna is imparted on the optical signal as frequency sidebands of an optical carrier frequency; and the frequency-dependent filter comprises a plurality of filter output ports and is configured to discriminate the frequency sidebands from the carrier frequency band in an optical signal propagating along the waveguide portion, downstream of the active region such that frequency sidebands having wavelengths that are shorter and longer than a wavelength of said carrier band can be recombined at the optical output of the antenna assembly.

17. An antenna assembly as claimed in claim 16 wherein:
the waveguide portion at least partially comprises a velocity matching electrooptic polymer in the active region of the antenna assembly;
a velocity $v_e$ of a millimeter or sub-millimeter wave signal traveling along the tapered slot antenna in the active region is at least partially a function of the dielectric constant of the electrooptic polymer;
a velocity $v_O$ of an optical signal propagating along the waveguide in the active region is at least partially a function of the index of refraction of the electrooptic polymer.

18. An antenna assembly as claimed in claim 16 wherein the waveguide portion at least partially comprises lithium niobate.

19. An antenna assembly as claimed in claim 16 wherein:
the antenna assembly comprises a plurality of the optical outputs;
the antenna portion comprises a plurality of the tapered slot antennae and electrooptic waveguides arranged in a focal plane array; and
the frequency-dependent filter comprises a plurality of input ports optically coupled to corresponding ones of the electrooptic waveguides and a plurality of filter output ports configured to direct optical signals to corresponding ones of the optical outputs of the antenna assembly.

20. An antenna assembly comprising a plurality of tapered slot antennae and a plurality of waveguide cores, wherein:
each of the waveguide cores extends from an optical input portion to an optical output portion along an optical path;
at least a portion of the optical path between the optical input portion and the optical output portion of each waveguide core is substantially parallel to a slotline of a corresponding tapered slot antenna in the active region of the tapered slot antenna;
the tapered slot antennae are arranged in a one or two-dimensional, focal plane array such that each of the tapered slot antennae defines an antenna pixel within said focal plane array; and
the tapered slot antennae are configured such that each of said tapered slot antennae receives a distinct pixel portion of a millimeter or sub-millimeter wave signal incident on said focal plane array.

21. An antenna assembly as claimed in claim 20 wherein the waveguide cores and the tapered slot antennae are configured as a parallel electrooptical circuit.

22. An antenna assembly as claimed in claim 20 wherein the waveguide cores and the tapered slot antennae are configured such that an optical signal propagating from an optical input portion of one of the waveguide cores to the optical output of the waveguide core passes through a single one of the active regions of the antenna assembly, the single active region comprising a single tapered slot antenna.

23. A method of fabricating an antenna assembly comprising an antenna portion and an electrooptic waveguide portion, wherein:
the antenna portion is provided with at least one tapered slot antenna;
the waveguide portion is provided with at least one electrooptic waveguide;
the electrooptic waveguide is configured to extend along at least a portion of an optical path between an optical input and an optical output of the antenna assembly;
the electrooptic waveguide is provided with a waveguide core extending substantially parallel to a slotline of the tapered slot antenna in an active region of the antenna assembly;
the electrooptic waveguide at least partially comprises a velocity matching electrooptic polymer in the active region of the antenna assembly such that a velocity $v_e$ of a millimeter or sub-millimeter wave signal traveling along the tapered slot antenna in the active region is at least partially a function of the dielectric constant of the velocity matching electrooptic polymer and a
velocity $v_O$ of an optical signal propagating along the waveguide in the active region is at least partially a function of the index of refraction of the velocity matching electrooptic polymer; and
the effective permittivity $\in_{\it eff}$ of the active region and the effective index of refraction $\eta_{\it eff}$ of the active region are established such that $v_e$ and $v_O$ satisfy the following relation:

$$\frac{|v_e - v_O|}{v_O} \leq 20\%.$$

24. A method as claimed in claim 23 wherein the effective permittivity $\in_{\it eff}$ of the active region and the effective index of refraction $\eta_{\it eff}$ of the active region are established by controlling one or more of the following parameters:
the dielectric constant of the velocity matching electrooptic polymer;
the dielectric constant of the substrate material forming the antenna portion;
the geometry of the velocity matching electrooptic polymer;
the geometry of the substrate material forming the antenna portion;
the thickness t of the active region;
the effective permittivity $\in_{\it eff}$ of the active region;
the effective index of refraction $\eta_{\it eff}$ of the active region;
the length of the active region; and
the propagation constant of the waveguide.

* * * * *

UNITED STATES PATENT AND TRADEMARK OFFICE
CERTIFICATE OF CORRECTION

| | |
|---|---|
| PATENT NO. | : 7,486,247 B2 |
| APPLICATION NO. | : 11/622700 |
| DATED | : February 3, 2009 |
| INVENTOR(S) | : Ridgway et al. |

It is certified that error appears in the above-identified patent and that said Letters Patent is hereby corrected as shown below:

Col. 11, line 5 "$\varepsilon_{\mathit{eff}}$ the" should read --$\varepsilon_{\mathit{eff}}$ of the--.

Signed and Sealed this

Twenty-sixth Day of May, 2009

JOHN DOLL
*Acting Director of the United States Patent and Trademark Office*